(12) United States Patent
Cheng

(10) Patent No.: US 7,177,087 B2
(45) Date of Patent: Feb. 13, 2007

(54) COMPOUND ASPERIC OCULAR FOR RIFLESCOPE

(75) Inventor: Chung-Chieh Cheng, Beaverton, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 69 days.

(21) Appl. No.: 10/975,716

(22) Filed: Oct. 26, 2004

(65) Prior Publication Data

US 2005/0094283 A1    May 5, 2005

Related U.S. Application Data

(60) Provisional application No. 60/515,294, filed on Oct. 28, 2003.

(51) Int. Cl.
G02B 25/00 (2006.01)
G02B 13/18 (2006.01)

(52) U.S. Cl. ...................................... 359/643; 359/717
(58) Field of Classification Search ........ 359/643–647, 359/717

See application file for complete search history.

(56) References Cited

U.S. PATENT DOCUMENTS

| | | |
|---|---|---|
| 1,073,789 A | 9/1913 | Wandersleb |
| 1,882,530 A | 10/1932 | Tronnier |
| 2,031,792 A | 2/1936 | Richter |
| 2,398,276 A | 4/1946 | Altman |
| 3,418,039 A | 12/1968 | Kingslake |
| 3,449,040 A | 6/1969 | Ruben |
| 4,682,866 A | 7/1987 | Volk ........................... 351/205 |
| 5,162,945 A * | 11/1992 | Matsuo et al. .............. 359/646 |
| 5,202,795 A * | 4/1993 | Kashima ..................... 359/645 |
| 5,583,698 A | 12/1996 | Yamada et al. ............. 359/687 |
| 5,644,425 A | 7/1997 | Palmer ........................ 359/409 |
| 5,731,905 A | 3/1998 | Imaizumi .................... 359/646 |
| 5,764,418 A | 6/1998 | Sato et al. .................. 359/646 |

(Continued)

OTHER PUBLICATIONS

John M. Hall and Jay N. Vizgaitis, *Asphere Diet*, reprinted from Photonics Spectra, Dec. 2000.

(Continued)

Primary Examiner—Scott J. Sugarman
(74) Attorney, Agent, or Firm—Stoel Rives LLP

(57) ABSTRACT

An ocular or eyepiece lens assembly for a riflescope or spotting scope or other types of telescopic optical systems which may include a three element lens assembly comprised of materials of three different refractive indices, at least one of the lens elements composed of optical plastic material, for example, an acrylic polymer, and having at least one aspheric surface. In one configuration, the ocular includes a first lens component on the objective side which is a positive singlet lens element having at least one aspheric surface, and a second lens component on the eyepoint side (i.e. the side of the observer's eye), the second lens component being a doublet lens composed of a cemented lens pair. The singlet lens is configured to correct aberrations accumulated from the previous optics, such as for the objective lens assembly and the erector lens assembly of a riflescope, and also pre-correct the aberrations caused by the doublet lens located on the eyepoint side of the aspheric singlet lens. Preferably, the lens elements are composed of materials of three different refractive indices, with at least the singlet lens being composed of optical plastic material such as for example an acrylic polymer.

20 Claims, 15 Drawing Sheets

U.S. PATENT DOCUMENTS

| | | | |
|---|---|---|---|
| 5,774,270 A | | 6/1998 | Yanari .................. 359/644 |
| 5,790,313 A | * | 8/1998 | Kanai .................. 359/645 |
| 6,005,711 A | | 12/1999 | Mai et al. ............. 359/424 |
| 6,064,530 A | * | 5/2000 | Yano ................... 359/645 |
| 6,349,004 B1 | * | 2/2002 | Fischer et al. ......... 359/708 |
| 2003/0179356 A1 | | 9/2003 | Schuster et al. ........ 355/67 |

OTHER PUBLICATIONS

*Asphere and Atorus*, http://www.zeiss.cz/4125680F0053A38D/ContentsWWWIntern/64F991656D6FA5134125688f0046dd10, visited Oct. 13, 2003.

Schott Glas—Optics for Devices—Products—Optical Glass, http://www.schott.com/optics_devices/english/products/precision_optical_glass.html, visited Oct. 20, 2003.

Simmons Aetec® Aspherical Lens System, http://www.simmonsoptics.com/page6_7/SimmonsPage6_7.html, visited Dec. 24, 2003.

Simmons Aetec® Binoculars, http://www.simmonsoptics.com/page18/SimmonsPage18.html, visited Dec. 24, 2003.

* cited by examiner

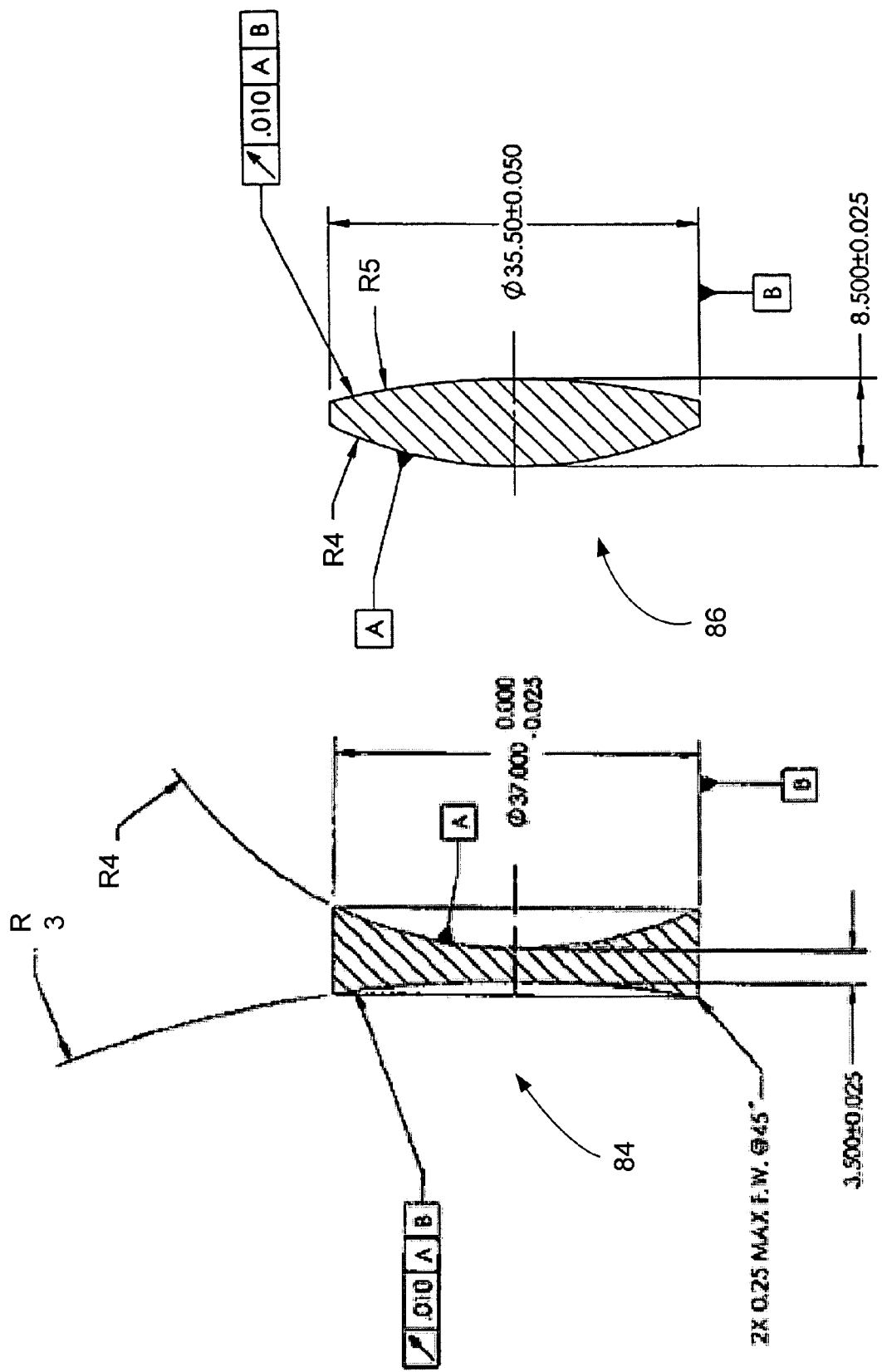

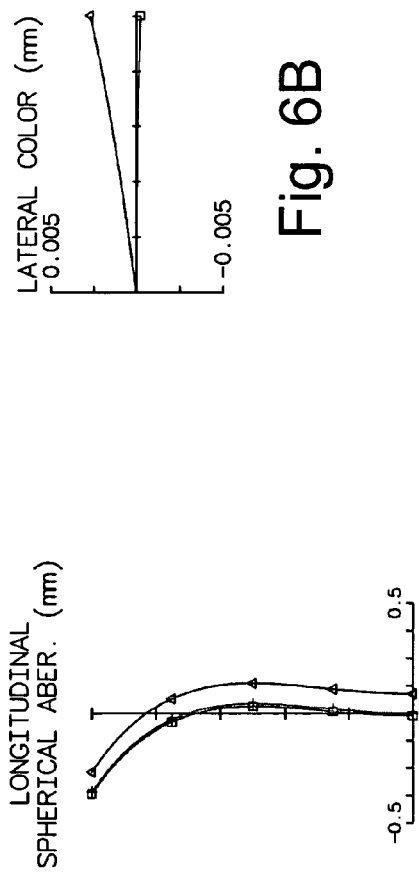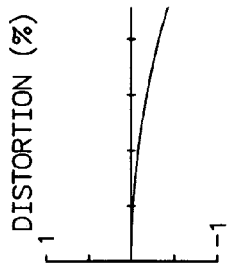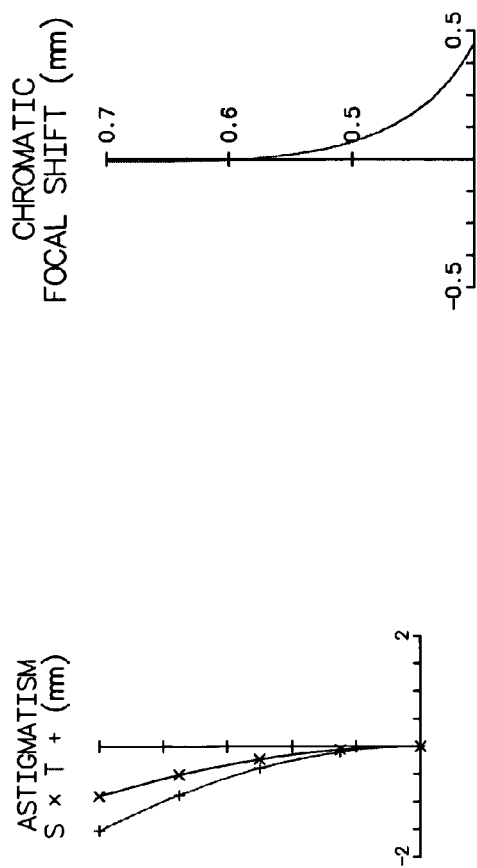
Fig. 6A  Fig. 6B  Fig. 6C  Fig. 6D  Fig. 6E

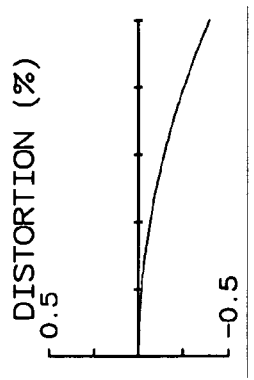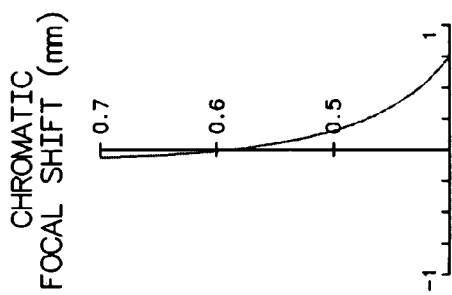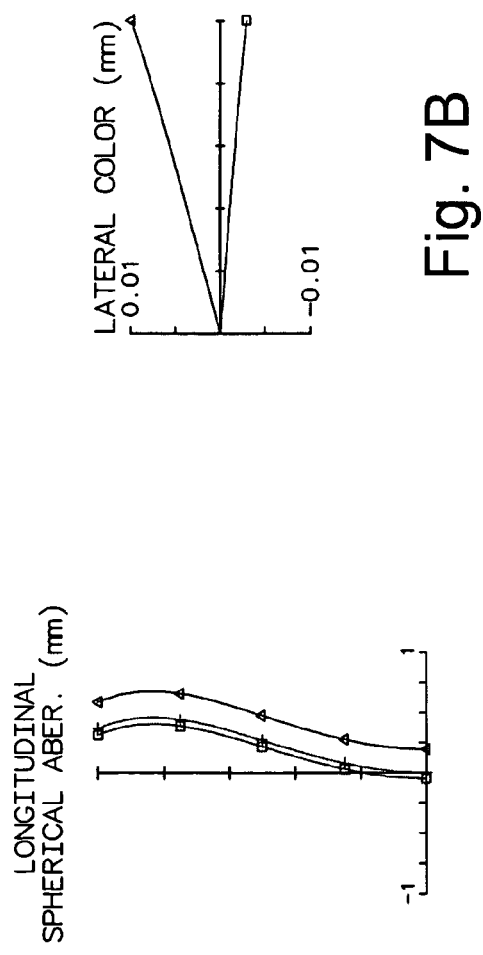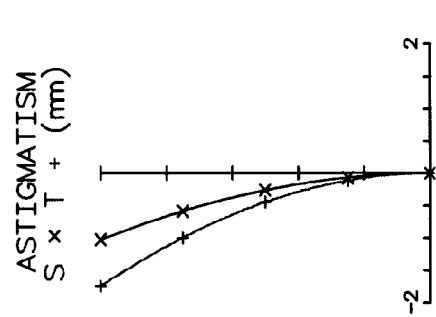

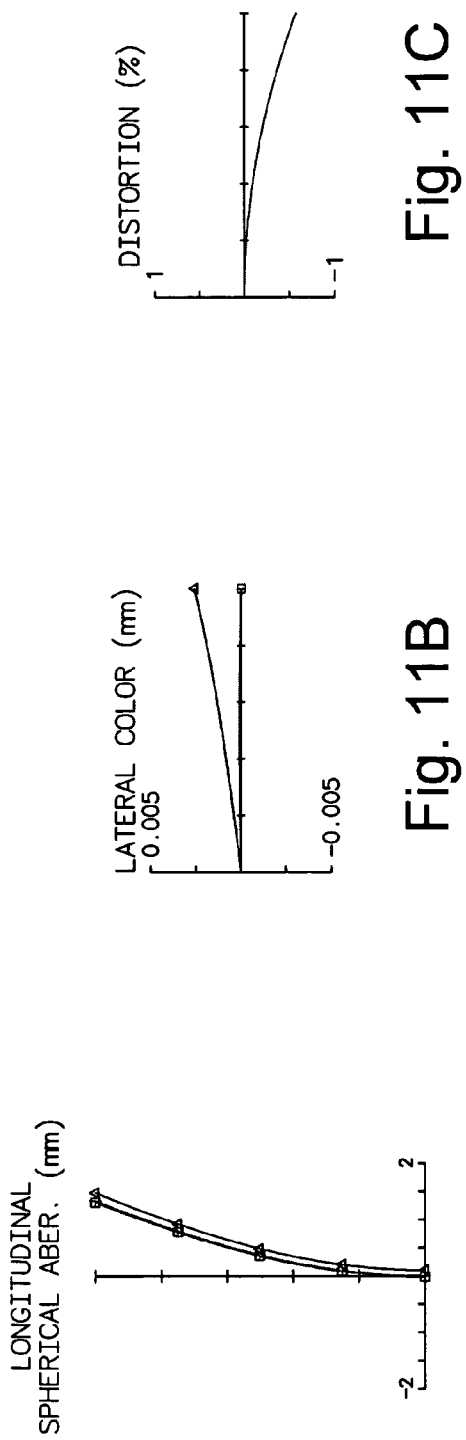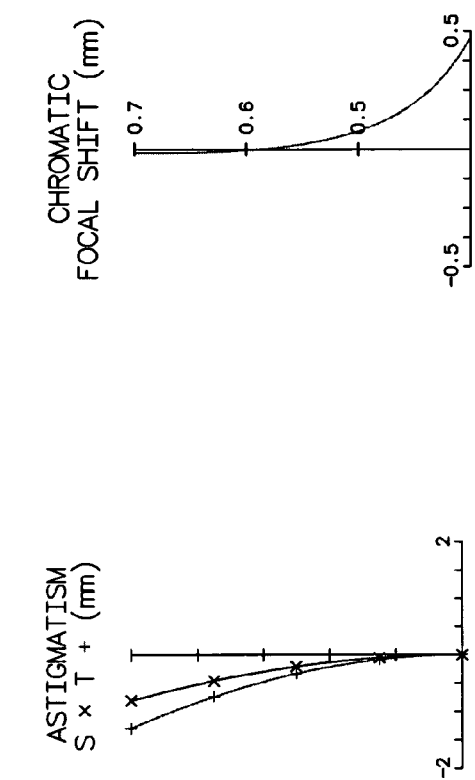
Fig. 11A
Fig. 11B
Fig. 11C
Fig. 11D
Fig. 11E

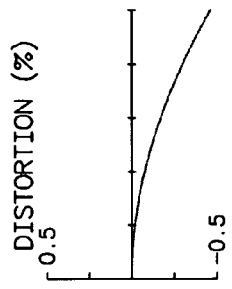
Fig. 13B
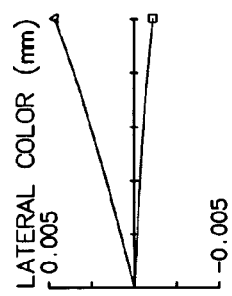
Fig. 13C
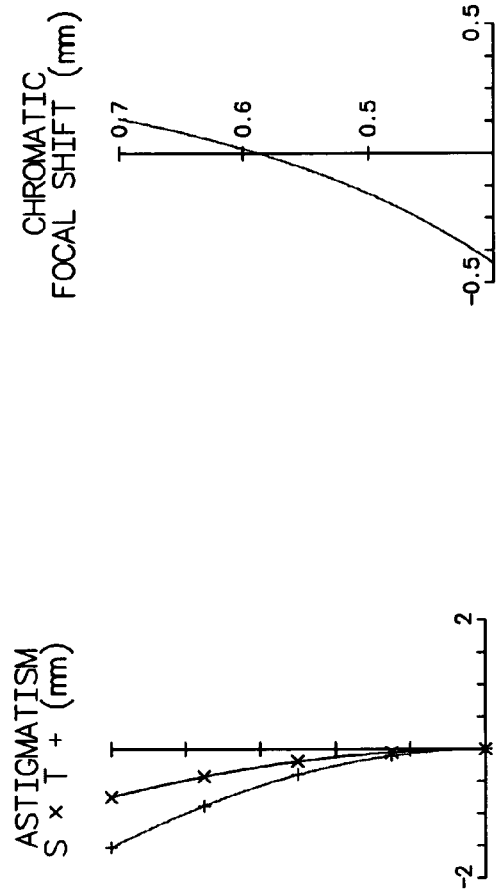
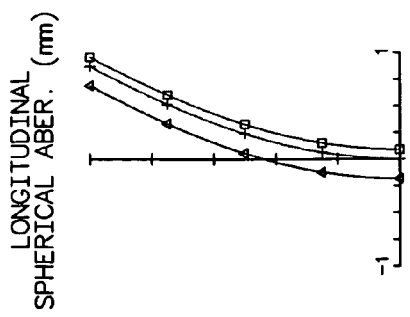
Fig. 13A

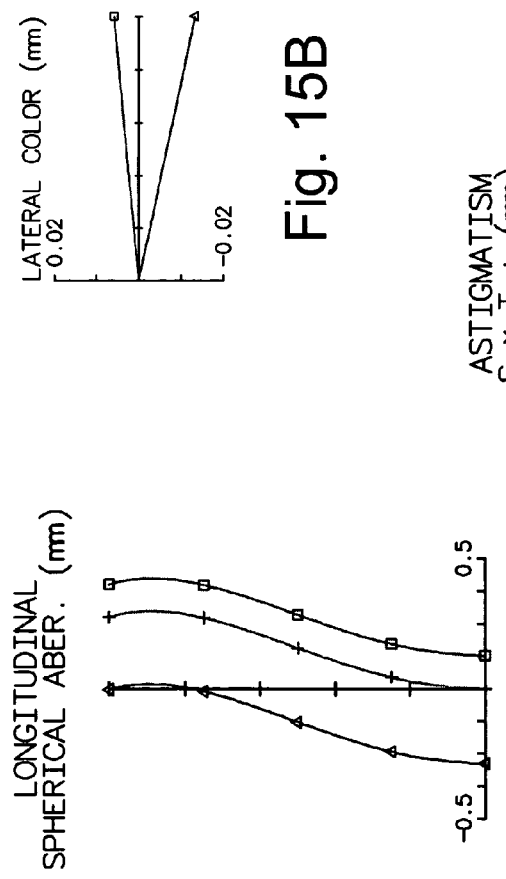
Fig. 15A
Fig. 15B
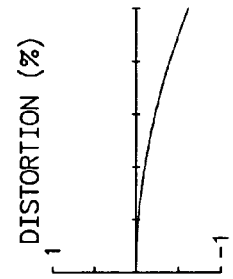
Fig. 15C
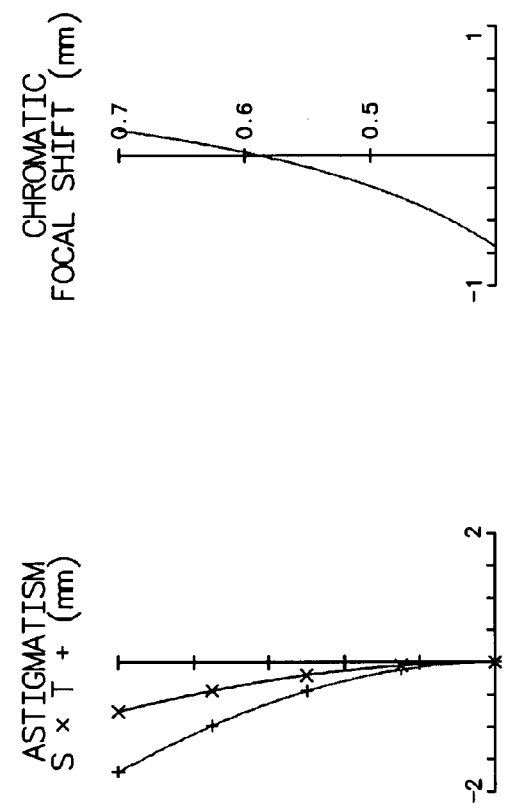
Fig. 15D
Fig. 15E

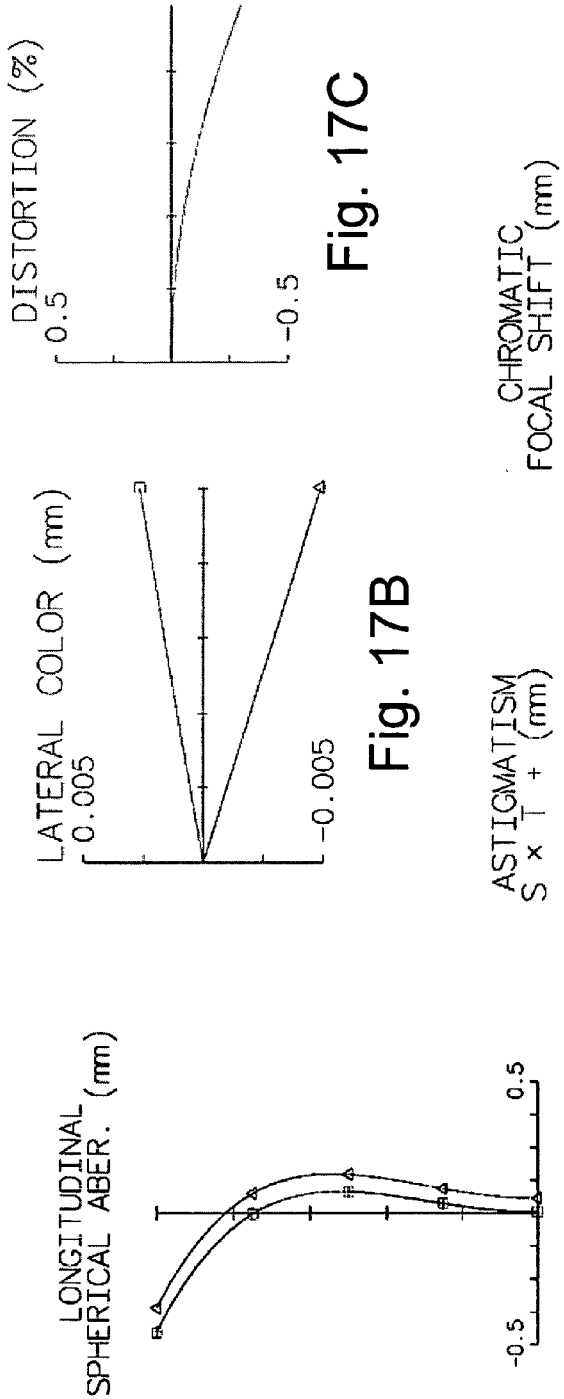

COMPOUND ASPERIC OCULAR FOR RIFLESCOPE

RELATED APPLICATION DATA

This application claims priority to U.S. provisional application Ser. No. 60/515,294 filed Oct. 28, 2003, hereby incorporated by reference.

BACKGROUND OF THE INVENTION

The field of the present invention generally relates to oculars or eyepieces for a riflescope or spotting scope or other types of telescopic optical systems.

Telescopic sights for rifles typically include an ocular or eyepiece and objective lenses positioned at opposite ends of a tubular housing. Conventional variable optical power telescopic sights include an erector lens or lens assembly positioned medially of the eyepiece and objective lenses movable along a central longitudinal axis of the housing for adjustment of the optical power.

Most oculars use lenses that have only spherical surfaces. To reduce aberrations, ordinarily, the number of lenses must be increased to achieve a desired aberration correction. This increase in the number of lenses increases both the weight and cost of the ocular. Efforts have been made by using glass lenses with aspheric surfaces to reduce aberrations. For example the article by John Hall and Jay Vizgaitis, "Aspheric Diet", Photonics Spectra (December 2000) describes a riflescope eyepiece in which two spherical lens elements are replaced with a single aspheric glass lens within an otherwise all spherical lens assembly.

The present inventors have recognized that aspheric glass lenses are expensive to manufacture and thus are not cost-effective for mass-production components in a riflescope, but that it would be desirable if a riflescope ocular could be economically adapted to accommodate aspheric lenses.

SUMMARY

The present invention relates to an improved ocular or eyepiece lens assembly. In a preferred configuration, the ocular comprises a three-element lens assembly comprised of materials of three different refractive indices, at least one of the lens elements composed of optical plastic material (such as for example an acrylic polymer) and having at least one aspheric surface. In a specific preferred configuration, the ocular comprises a first lens component on the objective side which is a positive singlet lens element (preferably bi-convex), and a second lens component on the eyepoint side (i.e. the side of the observer's eye). The second lens component is preferably a doublet lens comprising a cemented lens pair. In one example, the doublet lens may be comprised of a bi-convex lens on the eyepoint side and a negative lens element on the objective side, the negative lens element comprising either a bi-concave lens or a meniscus lens. The aspheric singlet lens is configured to correct aberrations accumulated from the previous optics (namely the objective lens assembly, the erector lens assembly, etc.) and also pre-correct the aberrations caused by the doublet lens located on the eyepoint side of the aspheric singlet lens.

BRIEF DESCRIPTION OF THE DRAWINGS

FIG. 4 is detailed view of the second lens element of the ocular lens triplet shown in FIG. 2.

FIG. 5 is detailed view of the third lens element of the ocular lens triplet shown in FIG. 2.

FIGS. 6A, 6B, 6C, 6D, 6E illustrate the longitudinal spherical aberration, the lateral color aberration, the distortion, the astigmatism, and the chromatic focal shift of the specific value set in the lens system of Example 1.

FIGS. 7A, 7B, 7C, 7D, 7E illustrate the longitudinal spherical aberration, the lateral color aberration, the distortion, the astigmatism, and the chromatic focal shift of the specific value set in the lens system of Example 2.

FIGS. 11A, 11B, 11C, 11D, 11E illustrate the longitudinal spherical aberration, the lateral color aberration, the distortion, the astigmatism, and the chromatic focal shift of the specific value set in the lens system of Example 5.

FIGS. 13A, 13B, 13C, 13D, 13E illustrate the longitudinal spherical aberration, the lateral color aberration, the distortion, the astigmatism, and the chromatic focal shift of the specific value set in the lens system of Example 6.

FIGS. 15A, 15B, 15C, 15D, 15E illustrate the longitudinal spherical aberration, the lateral color aberration, the distortion, the astigmatism, and the chromatic focal shift of the specific value set in the lens system of Example 7.

FIGS. 17A, 17B, 17C, 17D, 17E illustrate the longitudinal spherical aberration, the lateral color aberration, the distortion, the astigmatism, and the chromatic focal shift of the specific value set in the lens system of Example 8.

DETAILED DESCRIPTION OF PREFERRED EMBODIMENTS

Preferred embodiments will now be described with reference to the drawings. The preferred embodiments will be described in terms of a lens assembly for a riflescope or spotting scope, but the lens combination may be employed within binoculars, monoculars and other types of optical viewing mechanisms.

Figure 1:
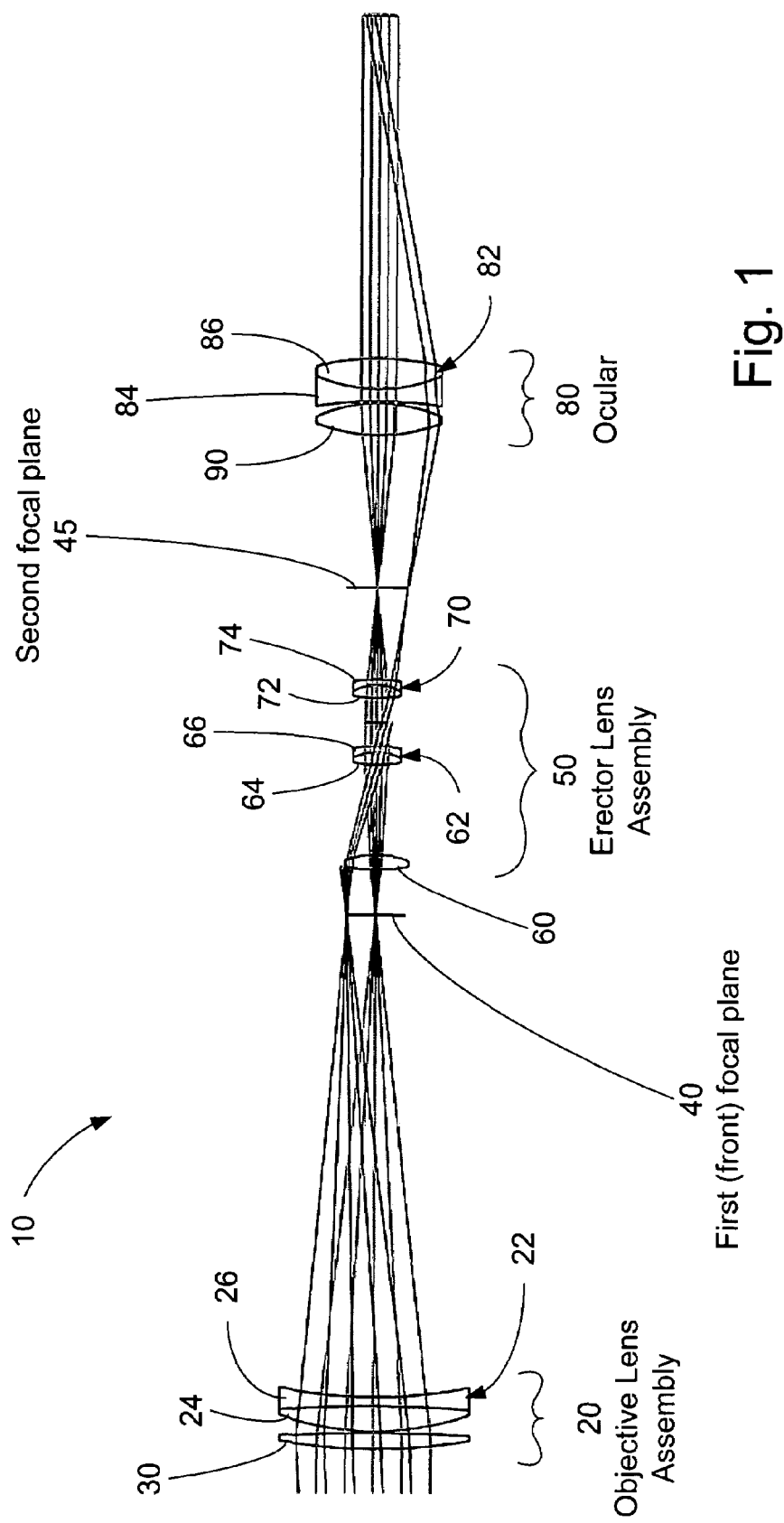
FIG. 1 is a view of an overall riflescope lens system according to a preferred embodiment and including a preferred ocular lens arrangement.

FIG. 1 illustrates a first embodiment of a lens assembly 10 for a riflescope or spotting scope comprised of an objective lens assembly 20 for focusing an object in the filed of view to an image at a first focal plane 40, an erector lens assembly 50 inverting the image and focusing it to a second focal plane 45, and an ocular 80 forming an image in the eyes of the user. The objective lens assembly 20 comprises a first spherical lens 30 (bi-convex) positioned in front of a lens doublet 22. The lens doublet 22 comprises a front bi-convex spherical lens 24 and a rear bi-concave spherical lens 26. The erector lens assembly 50 includes a first spherical biconvex lens 60 positioned in front of a first lens doublet 62 and a second lens doublet 70. The first lens doublet 62 comprises a front meniscus spherical lens 64 and a rear meniscus spherical lens 66. The second lens doublet 70 comprises a front bi-convex spherical lens 72 and a rear meniscus spherical lens 74.

For the purposes of this disclosure, the preferred configurations for the objective lens assembly 20 and erector assembly 50 are taken from the model VX-II 3–9×50 riflescope available from Leupold & Stevens, Inc. of Beaverton, Oreg. The ocular 80 and other oculars described herein are intended to be particularly useful in combination with the objective lens assembly and erector assembly of the above-mentioned Leupold riflescope. These oculars may also be useful for other riflescope configurations as well as spotting scopes and other viewing systems using an ocular.

Figure 2:
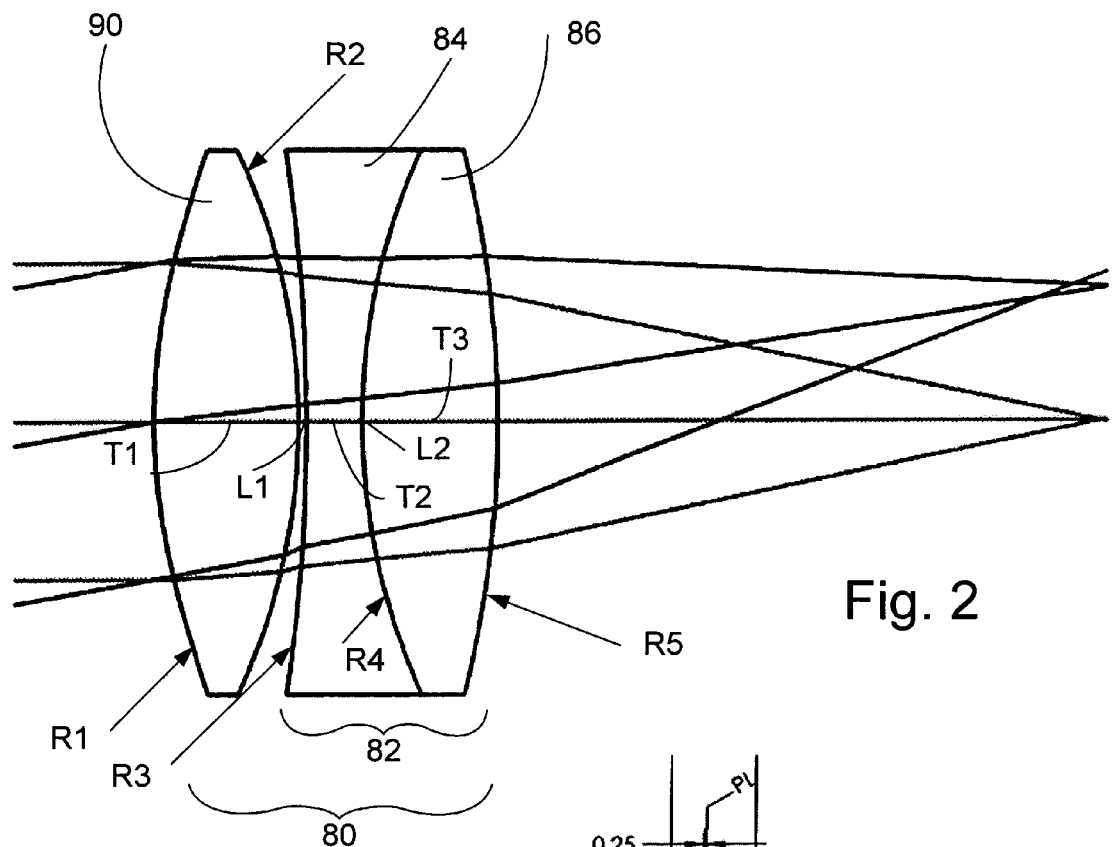
FIG. 2 is more detailed view of the ocular lens triplet of FIG. 1.
Figure 3:
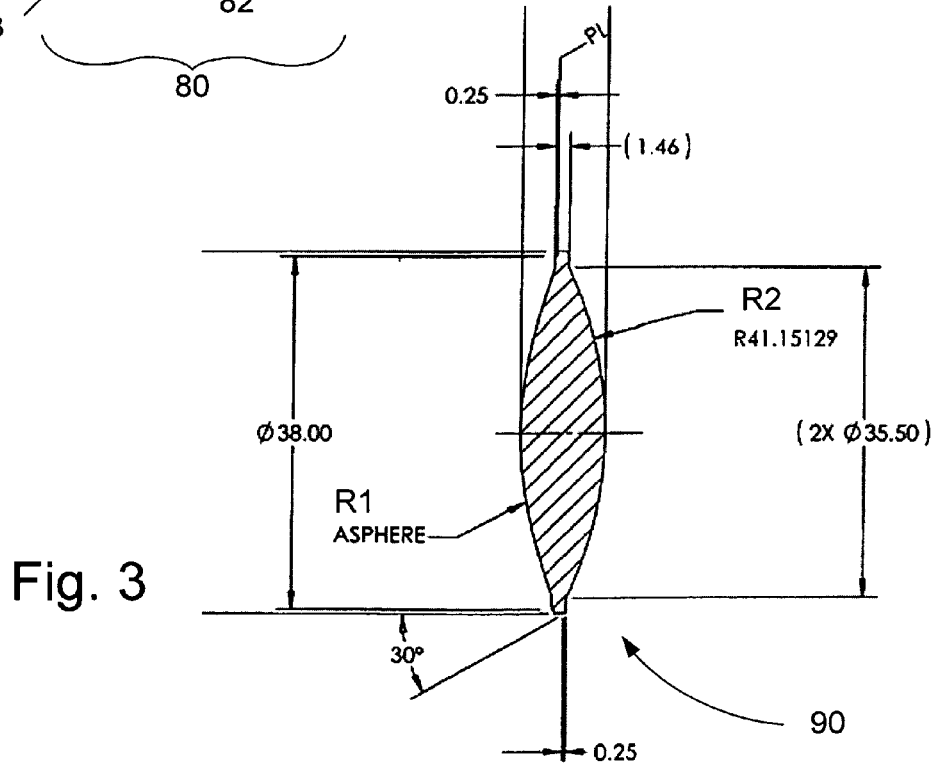
FIG. 3 is detailed view of the aspheric lens element of the ocular lens triplet shown in FIG. 2.
Figure 8C:
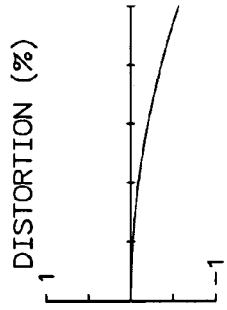
FIGS. 8A, 8B, 8C, 8D, 8E illustrate the longitudinal spherical aberration, the lateral color aberration, the distortion, the astigmatism, and the chromatic focal shift of the specific value set in the lens system of Example 3.
Figure 8B:
Figure 8A:
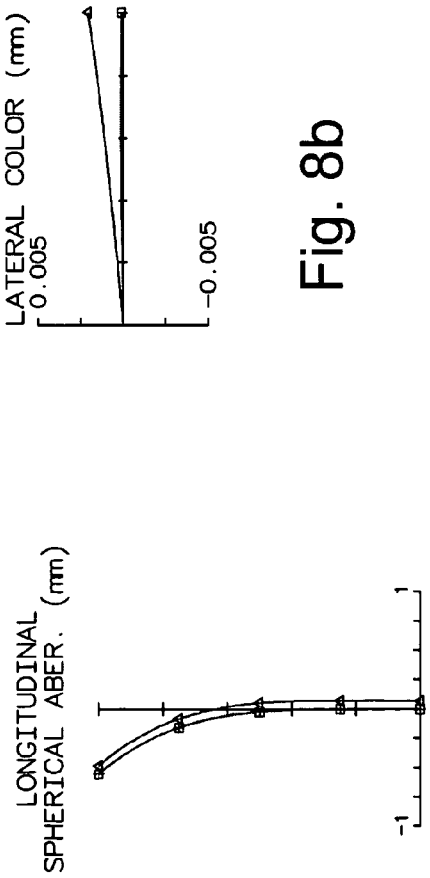
Figure 8E:
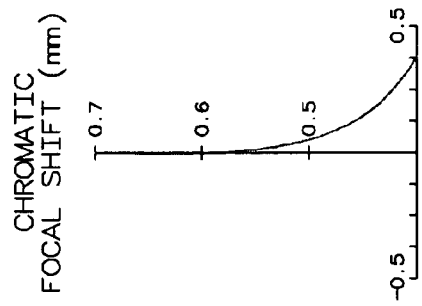
Figure 8D:
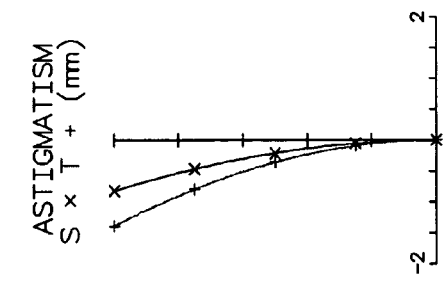
Figure 9C:
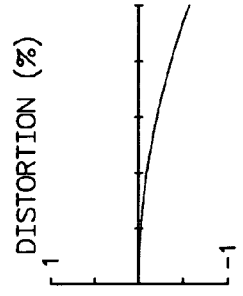
FIGS. 9A, 9B, 9C, 9D, 9E illustrate the longitudinal spherical aberration, the lateral color aberration, the distortion, the astigmatism, and the chromatic focal shift of the specific value set in the lens system of Example 4.
Figure 9B:
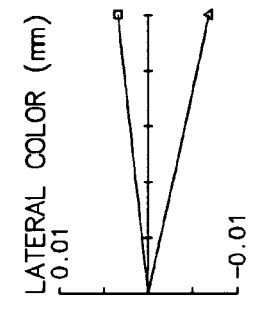
Figure 9E:
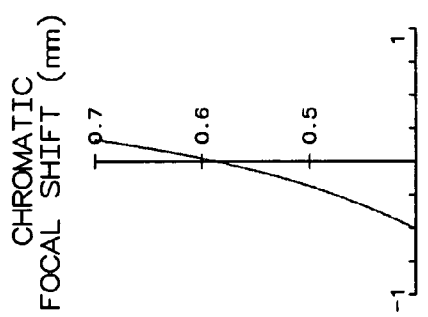
Figure 9D:
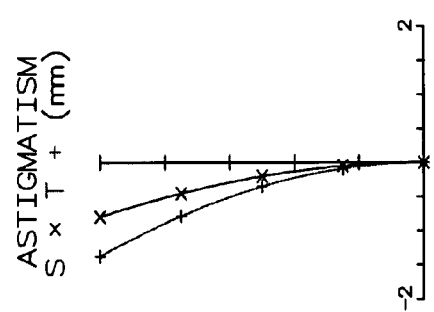
Figure 9A:
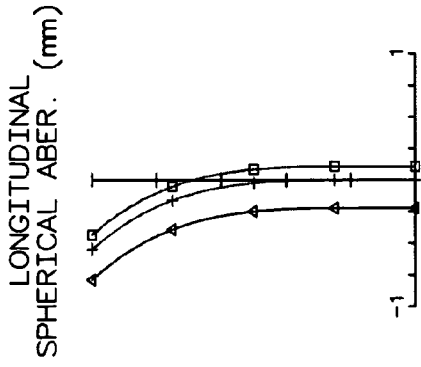

In a first preferred embodiment, the ocular 80 comprises a three-element lens assembly including an aspheric lens element 90 having at least one aspheric Surface, and a lens doublet 82. The lens doublet 82 comprises a front bi-concave spherical lens 84 and a rear bi-convex spherical lens 86. The lens doublet is preferably a cemented lens pair. Details of the ocular 80 are illustrated in FIGS. 2–4. The three lens elements 90, 84, 86 of the ocular 80 form a triplet lens set. The lens elements of the ocular triplet 80 are of three different materials with different refractive indices.

The first lens 90 preferably includes at least one aspheric surface R1. Following Example 1 is a preferred lens prescription for the lenses of ocular 80.

EXAMPLE 1

EFL=48.000 mm

| Element | $N_d$ | $V_d$ | Radius (mm) | Thickness or Separation (mm) | Aperture Radius (mm) | Material |
|---|---|---|---|---|---|---|
| 90 | 1.491756 | 57.44 | R1 = 37.661677 | T1 = 9.000000 | 17.250000 | PMMA |
|   |   |   | R2 = −41.151290 | L1 = 0.500000 |   |   |
| 84 | 1.755131 | 27.38 | R3 = −118.852131 | T2 = 3.500000 | 17.250000 | N-SF4 |
|   |   |   | R4 = 41.986456 | L2 = 0.00 |   |   |
| 86 | 1.57250 | 57.55 | R4 = 41.986456 | T3 = 8.500000 | 17.250000 | BAK1 |
|   |   |   | R5 = −71.729138 |   |   |   | where $N_d$=the refractive index and $V_d$=the Abbe number of the lens material. Both are measured at 587.56 nm (yellow helium d-line).

The material of the aspheric lens 90 is preferably an optical plastic that may be constructed via a molding process. The PMMA acrylic optical plastic is available from AtoHaas Americas Inc. in Philadelphia, Pa. In this Example 1, the second lens 84 is constructed of NSF4 optical glass; and the third lens 86 is constructed of BAK1 optical glass. Both the NSF4 and BAK1 designations are optical glass designations from Schott Glass Technology in Duryea, Pa. 18642, USA.

The aspheric lens 90 is positioned at a distance L1 to the lens. In a preferred design, the distance L1 is relatively small, placing the lens 90 in relatively close proximity to the lens 84. In a preferred range, L1 is less than 10% of the diameter of the lens 90, or more preferably may be less than 2% of the lens diameter. In the above example, L1 /(2·Radius)=0.5/(2·17.25)=1.45%.

The aspheric lens 90 is a singlet lens with front aspheric profile surface R1 and a rear spherical surface R2. The aspheric profile R1 of the lens 90 is designed to correct aberrations accumulated from the previous optics (objective lens assembly 20, erector lens assembly 50, etc.) and also pre-correct the aberrations caused by the lens doublet 82.

The aspheric profile of a lens surface is mainly determined by the conic constant K where $K=-e^2$ where e is the eccentricity of a conic section. The aspheric profile may be defined according to the equation:

$$SAG = (Y^2/R)/[1+\sqrt{1-(1+K)(Y/R)^2}] + DY^4 + EY^6 + FY^8 \quad (1)$$

where SAG is the surface sag as measured by the distance between the vertex of the aspheric surface and the point on the aspheric surface when the height of the point from the optical axis is expressed by Y; R denotes the radius of curvature of the vertex of the aspheric surface; K denotes the conical constant; and D, E and F denote aspheric coefficients of the first three rotationally symmetrical terms of a general polynomial that varies in relation to the radial height Y from the optical axis.

A preferred prescription for the aspheric surface R1 of the lens element 90 with the lens prescription of Example 1 is R=37.661677
K=−4.089255
D=−3.3933 e-07
E=−3.6632 e-09
F=2.8010 e-12

In a preferred construction, the singlet 90 uses a non-aggressive aspheric surface profile to achieve superior performance at low cost. Since only the fourth, sixth, and eighth order aspheric surface coefficients D, E, and F are used, a relatively non-aggressive aspheric adjustment is achieved, which simplifies both lens design and manufacture.

The lens design example given above was formulated using the OSLO® optical design software available from Lambda Research Corporation. FIGS. 6A, 6B, 6C, 6D, 6E are graphs illustrating the longitudinal spherical aberration, the lateral color aberration, the distortion, the astigmatism, and the chromatic focal shift of the specific value set in the lens system of Example 1 calculated using the OSLO® optical design program.

For each of the graphs herein, the symbols on the curves refer to the wavelengths as follows:

wavelength: +:0.588 μm Δ:0.486 μm □:0.656 μm

The following Examples 2, 3 and 4 provide some alternate lens prescriptions for the ocular triplet 80 using the same type of lens elements 90, 84, 86 as illustrated in FIG. 2.

EXAMPLE 2

EFL=53.594 mm

| Element | $N_d$ | $V_d$ | Radius (mm) | Thickness or Separation (mm) | Aperture Radius (mm) | Material |
|---|---|---|---|---|---|---|
| 90 | 1.491756 | 57.44 | R1 = 35.858912<br>R2 = −38.931562 | T1 = 10.000000<br>L1 = 0.500000 | 17.250000 | PMMA |
| 84 | 1.698952 | 30.07 | R3 = −84.327272<br>R4 = 34.025179 | T2 = 3.500000<br>L2 = 0.00 | 17.250000 | SF15 |
| 86 | 1.516800 | 64.17 | R4 = 34.025179<br>R5 = −73.834405 | T3 = 8.500000 | 17.250000 | BK7 |

The aspheric lens prescription for the aspheric surface R1 of Example 2 is as follows R=35.858912
K=−3.735039
D=−3.6585e-07
E=−3.8935e-09
F=2.5635e-12

FIGS. 7A, 7B, 7C, 7D, 7E illustrate the longitudinal spherical aberration, the lateral color aberration, the distortion, the astigmatism, and the chromatic focal shift of the specific value set in the lens system of Example 2 calculated using the OSLO® optical design program.

EXAMPLE 3

EFL=44.753 mm

| Element | $N_d$ | $V_d$ | Radius (mm) | Thickness or Separation (mm) | Aperture Radius (mm) | Material |
|---|---|---|---|---|---|---|
| 90 | 1.491756 | 57.44 | R1 = 37.467650<br>R2 = −41.054523 | T1 = 9.000000<br>L1 = 0.500000 | 17.250000 | PMMA |
| 84 | 1.755199 | 27.51 | R3 = −115.314001<br>R4 = 41.865547 | T2 = 3.500000<br>L2 = 0.00 | 17.250000 | S-TIH4 |
| 86 | 1.620410 | 60.32 | R4 = 41.865547<br>R5 = −70.667069 | T3 = 8.500000 | 17.250000 | SK16 |

The aspheric lens prescription for the aspheric surface R1 of Example 3 is as follows:

R=37.467650
K=−4.055558
D=−3.5361e-07
E=−3.6659e-09
F=2.7960e-12

FIGS. 8A, 8B, 8C, 8D, 8E illustrate the longitudinal spherical aberration, the lateral color aberration, the distortion, the astigmatism, and the chromatic focal shift of the specific value set in the lens system of Example 3 calculated using the OSLO® optical design program.

EXAMPLE 4

EFL=43.739 mm

| Element | $N_d$ | $V_d$ | Radius (mm) | Thickness or Separation (mm) | Aperture Radius (mm) | Material |
|---|---|---|---|---|---|---|
| 90 | 1.491756 | 57.44 | R1 = 37.467650<br>R2 = −41.054523 | T1 = 9.000000<br>L1 = 0.500000 | 17.250000 | PMMA |
| 84 | 1.616592 | 36.63 | R3 = −115.314001<br>R4 = 41.865547 | T2 = 3.500000<br>L2 = 0.00 | 17.250000 | F4 |
| 86 | 1.516800 | 64.17 | R4 = 41.865547<br>R5 = −70.667069 | T3 = 8.500000 | 17.250000 | BK7 |

The aspheric lens prescription for the aspheric surface R1 of Example 4 is set forth as follows:

R=37.467650
K=−4.055558
D=−3.5361e-07
E=−3.6659e-09
F=2.7960e-12

FIGS. 9A, 9B, 9C, 9D, 9E illustrate the longitudinal spherical aberration, the lateral color aberration, the distortion, the astigmatism, and the chromatic focal shift of the specific value set in the lens system of Example 4 calculated using the OSLO® optical design program.

Figure 10:
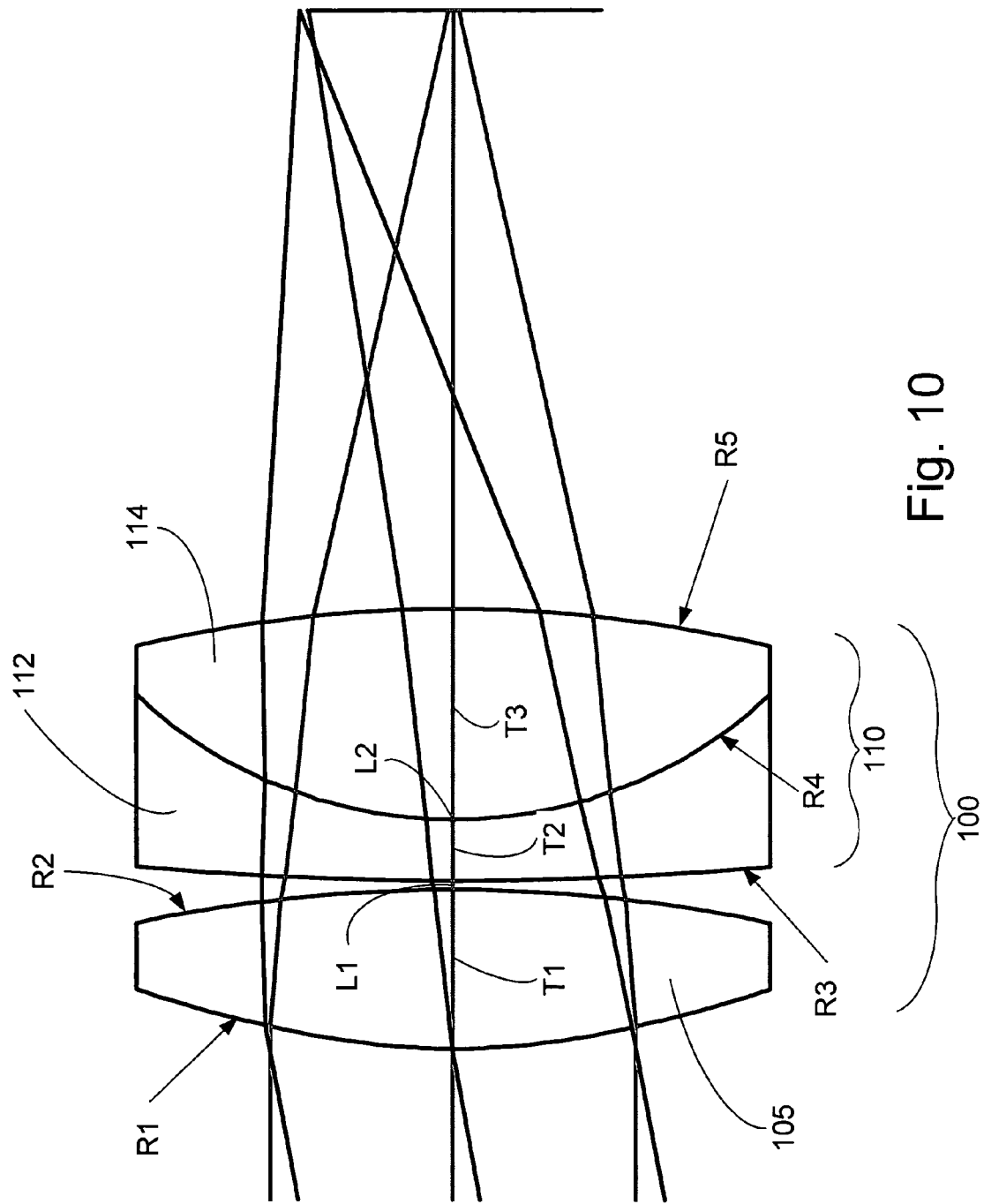
FIG. 10 is detailed view of an alternate ocular lens triplet for the lens system of Example 5.

In each of the previous Examples 1–4 of the ocular, the types of lens elements was the same, namely a bi-convex singlet lens and a lens doublet comprised of a front bi-concave spherical lens and a rear bi-convex spherical lens. As between those examples, only the lens element radii and/or lens materials were changed. Different lens combinations may be implemented. FIG. 10 illustrates an alternate ocular triplet 100 having a different lens element combination. A preferred lens prescription for the ocular triplet 100 is set forth below in Example 5. The ocular triplet 100 includes a first element comprising a bi-convex lens 105 and a lens doublet 110. The lens doublet 110 is comprised of a meniscus lens 112 and a bi-convex lens 114. The lens doublet 110 is preferably a cemented lens pair. The first lens 100 preferably includes at least one aspheric surface R1.

As in the previous examples, the three lens elements 105, 112, 114 of the ocular 100 form a triplet lens set. The lens elements of the ocular triplet 100 are of three different materials with different reflective indices. Following Example 5 is a lens prescription for the lenses of ocular 100.

EXAMPLE 5

EFL=45.583 mm

| Element | $N_d$ | $V_d$ | Radius (mm) | Thickness or Separation (mm) | Aperture Radius (mm) | Material |
|---|---|---|---|---|---|---|
| 105 | 1.491756 | 57.44 | R1 = 37.661677<br>R2 = −80.058800 | T1 = 9.000000<br>L1 = 0.500000 | 17.250000 | PMMA |
| 112 | 1.755131 | 27.38 | R3 = 183.092585<br>R4 = 24.419087 | T2 = 3.500000<br>L2 = 0.00 | 17.250000 | N-SF4 |
| 114 | 1.572500 | 57.55 | R4 = 24.419087<br>R5 = −71.729138 | T3 = 12.00000 | 17.250000 | BAK1 |

The aspheric lens prescription for the aspheric surface R1 of Example 5 is set forth as follows:

R=37.661677
K=−4.089255
D=−3.3933e-07
E=−3.6632e-09
F=2.8010e-12

FIGS. 11A, 11B, 11C, 11D, 11E illustrate the longitudinal spherical aberration, the lateral color aberration, the distortion, the astigmatism, and the chromatic focal shift of the specific value set in the lens system of Example 5 calculated using the OSLO® optical design program.

Figure 12:
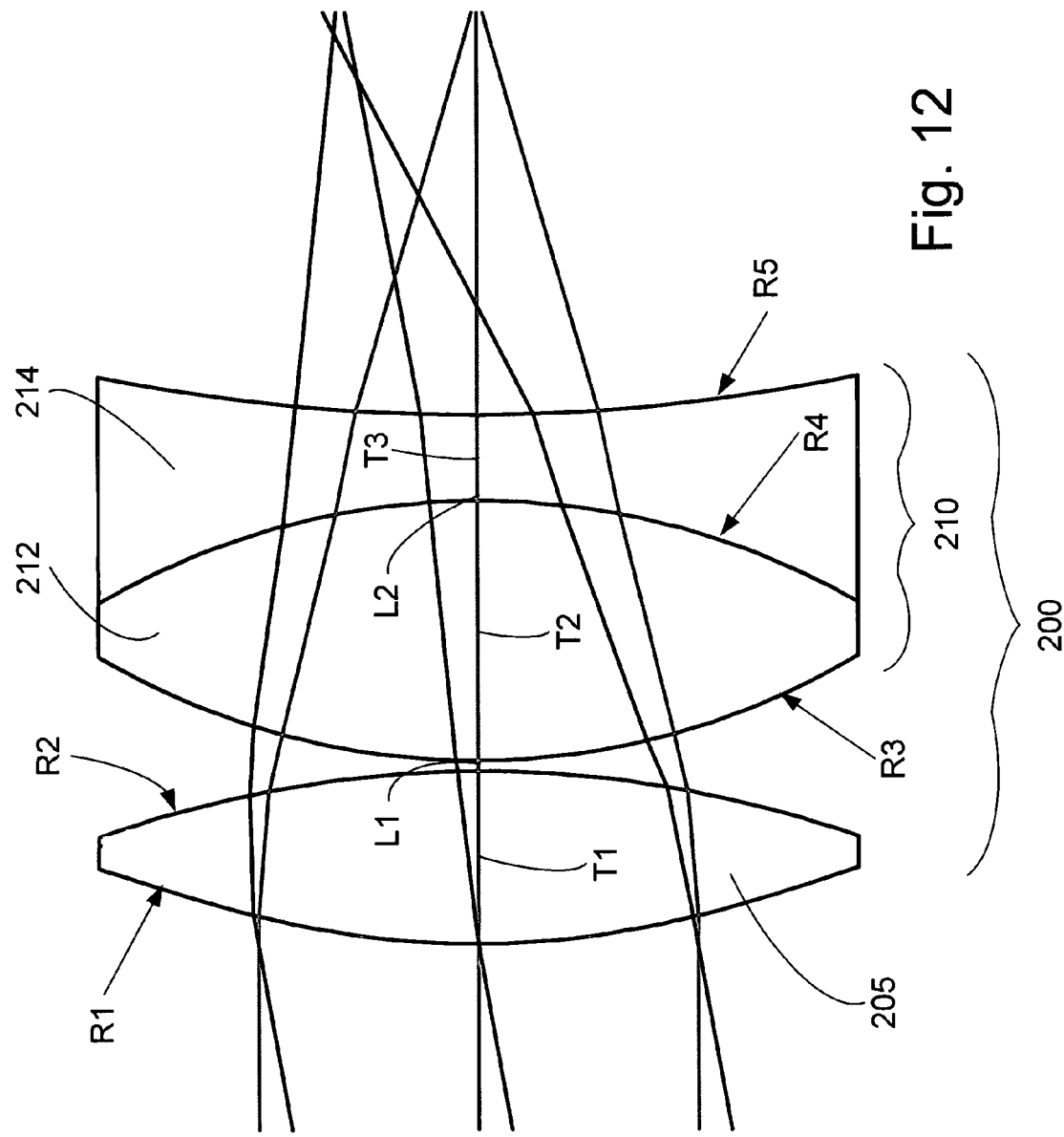
FIG. 12 is detailed view of another alternate ocular lens triplet for the lens system of Example 6.

FIG. 12 illustrates another alternate ocular triplet 200 having a different lens element combination. A preferred lens prescription for the ocular triplet 200 is set forth below in Example 6. The ocular triplet 200 includes a first element comprising a bi-convex lens 205 and a lens doublet 210. The lens doublet 210 is comprised of a bi-convex lens 212 and a bi-concave lens 214. The lens doublet 210 is preferably a cemented lens pair. The first lens 200 preferably includes at least one aspheric surface R1.

As in the previous examples, the three lens elements 205, 212, 214 of the ocular 200 form a triplet lens set. The lens elements of the ocular triplet 200 are of three different materials with different reflective indices. Following Example 6 is a lens prescription for the lenses of ocular 200.

EXAMPLE 6

EFL=34.196 mm

| Element | $N_d$ | $V_d$ | Radius (mm) | Thickness or Separation (mm) | Aperture Radius (mm) | Material |
|---------|-------|-------|-------------|------------------------------|----------------------|----------|
| 205 | 1.491756 | 57.44 | R1 = 35.858912<br>R2 = −50.064669 | T1 = 8.000000<br>L1 = 0.500000 | 17.250000 | PMMA |
| 212 | 1.516800 | 64.17 | R3 = 33.177024<br>R4 = −34.025179 | T2 = 12.00000<br>L2 = 0.00 | 17.250000 | BK7 |
| 214 | 1.698952 | 30.07 | R4 = −34.025179<br>R5 = 84.327272 | T3 = 4.000000 | 17.250000 | SF15 |

The aspheric lens prescription for the aspheric surface R1 of Example 6 is set forth as follows:
R=35.858912
K=−3.735039
D=−3.6585e-07
E=−3.8935e-09
F=2.5635e-12

FIGS. 13A, 13B, 13C, 13D, 13E illustrate the longitudinal spherical aberration, the lateral color aberration, the distortion, the astigmatism, and the chromatic focal shift of the specific value set in the lens system of Example 6 calculated using the OSLO® optical design program.

Figure 14:
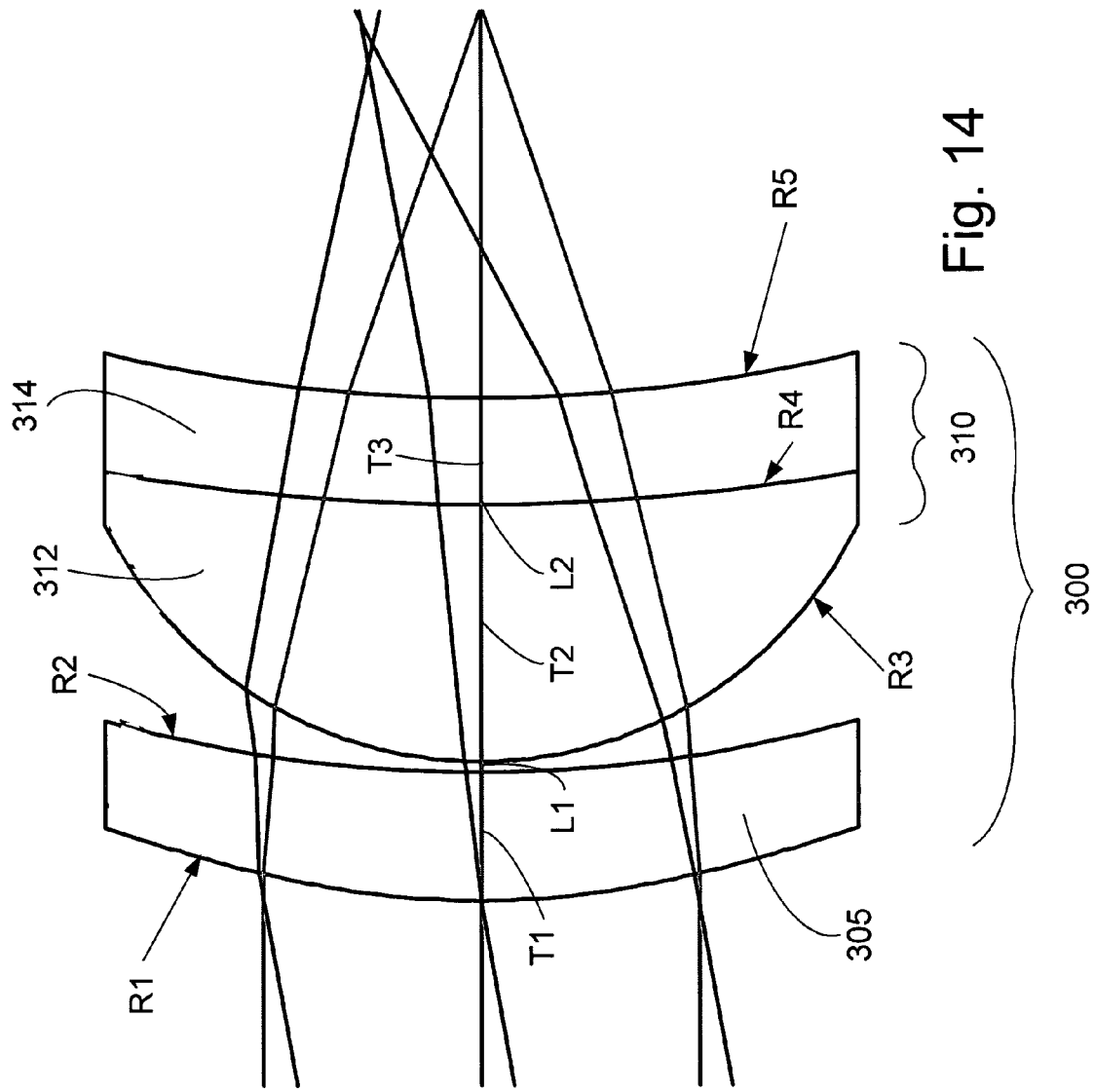
FIG. 14 is detailed view of another alternate ocular lens triplet for the lens system of Example 7.

FIG. 14 illustrates another alternate ocular triplet 300 having a different lens element combination. A preferred lens prescription for the ocular triplet 300 is set forth below in Example 7. The ocular triplet 300 includes a first element comprising a meniscus lens 305 and a lens doublet 310. The lens doublet 310 is comprised of a meniscus lens 312 and a meniscus lens 314. The lens doublet 310 is preferably a cemented lens pair. The first lens 305 preferably includes at least one aspheric surface R1.

As in the previous examples, the three lens elements 305, 312, 314 of the ocular 300 form a triplet lens set. The lens elements of the ocular triplet 300 are of three different materials with different reflective indices. Following Example 7 is a lens prescription for the lenses of ocular 300.

EXAMPLE 7

EFL=31.638 mm

The aspheric lens prescription for the aspheric surface R1 of Example 7 is set forth as follows:
R=37.467650
K=−4.055558
D=−3.5361e-07
E=−3.6659e-09
F=2.7960e-12

FIGS. 15A, 15B, 15C, 15D, 15E illustrate the longitudinal spherical aberration, the lateral color aberration, the distortion, the astigmatism, and the chromatic focal shift of the specific value set in the lens system of Example 7 calculated using the OSLO® optical design program.

Figure 16:
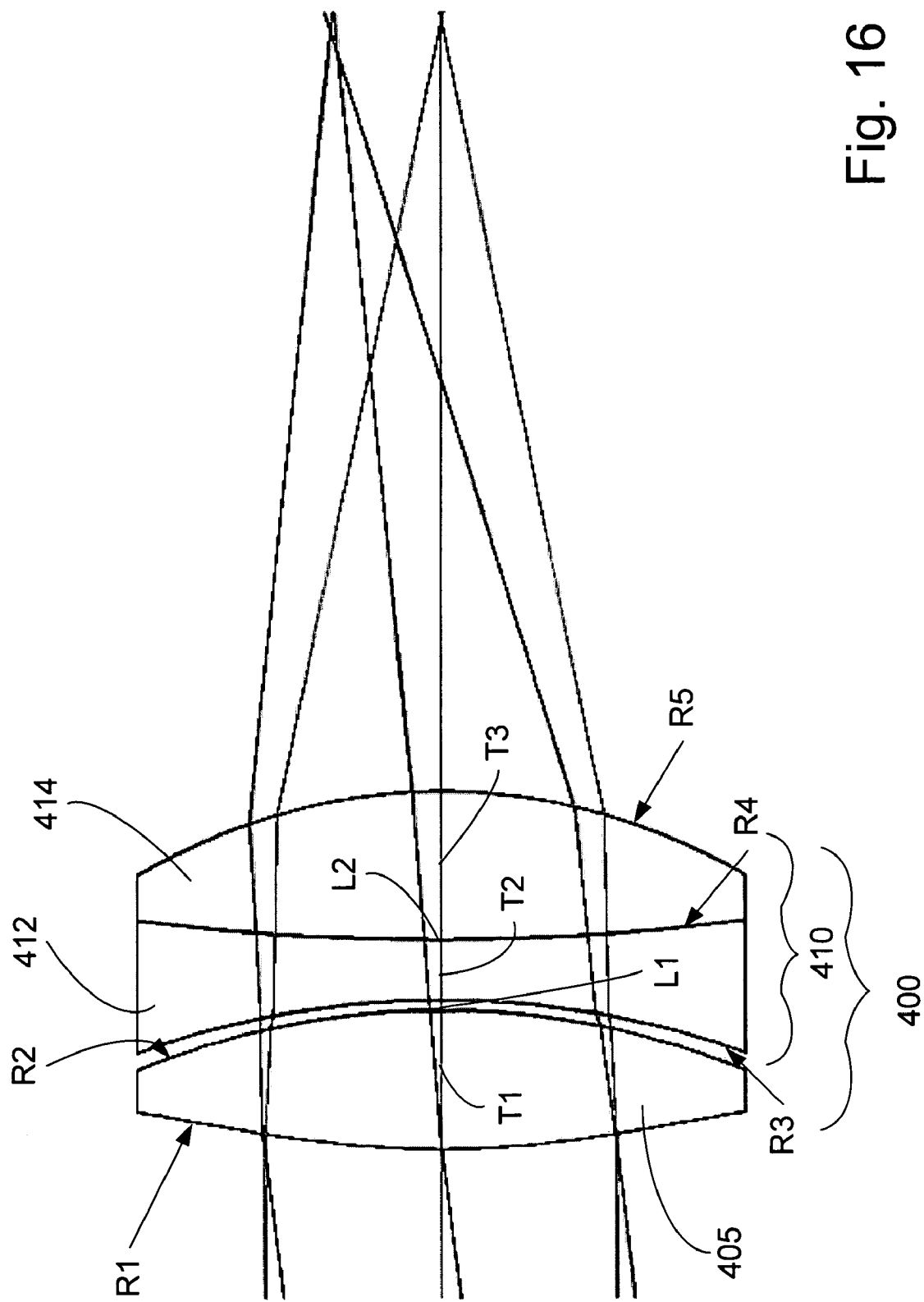
FIG. 16 is detailed view of another alternate ocular lens triplet for the lens system of Example 8.

FIG. 16 illustrates another alternate ocular triplet 400 having a different lens element combination. A preferred lens prescription for the ocular triplet 400 is set forth below in Example 8. Currently, the embodiment of Example 8 is a most preferred ocular configuration. The ocular triplet 400 includes a first element comprising a bi-convex lens 405 and a lens doublet 410. The lens doublet 410 is comprised of a bi-concave lens 412 and a bi-convex lens 414. The lens doublet 410 is preferably a cemented lens pair. The first lens 405 preferably includes at least one aspheric surface R1.

As in the previous examples, the three lens elements 405, 412, 414 of the ocular 400 form a triplet lens set. The lens elements of the ocular triplet 400 are of three different materials with different reflective indices. Following Example 8 is a lens prescription for the lenses of ocular 400.

| Element | $N_d$ | $V_d$ | Radius (mm) | Thickness or Separation (mm) | Aperture Radius (mm) | Material |
|---------|-------|-------|-------------|------------------------------|----------------------|----------|
| 305 | 1.491756 | 57.44 | R1 = 37.467650<br>R2 = 63.197562 | T1 = 6.000000<br>L1 = 0.500000 | 17.250000 | PMMA |
| 312 | 1.620410 | 60.32 | R3 = 19.006037<br>R4 = 100.00000 | T2 = 12.00000<br>L2 = 0.00 | 17.250000 | SK16 |
| 314 | 1.755199 | 27.51 | R4 = 100.00000<br>R5 = 72.772887 | T3 = 5.000000 | 17.250000 | S-TIH4 |

EXAMPLE 8

EFL=49.8462 mm

| Element | $N_d$ | $V_d$ | Radius (mm) | Thickness or Separation (mm) | Aperture Radius (mm) | Material |
|---|---|---|---|---|---|---|
| 405 | 1.491756 | 57.44 | R1 = 51.611983 | T1 = 8.000000 | 17.250000 | PMMA |
|  |  |  | R2 = −44.514937 | L1 = 0.600000 |  |  |
| 412 | 1.755131 | 27.38 | R3 = −49.893910 | T2 = 3.500000 | 17.250000 | N-SF4 |
|  |  |  | R4 = 41.865547 | L2 = 0.00 |  |  |
| 414 | 1.572500 | 57.55 | R4 = 41.865547 | T3 = 8.500000 | 17.250000 | N-BAK1 |
|  |  |  | R5 = −70.667069 |  |  |  |

The aspheric lens prescription for the aspheric surface R1 of Example 8 is set forth as follows:

R=51.611983
K=−1.7344
D=−9.2690e-06
E=6.0153e-09
F=−7.1982e-12

FIGS. 17A, 17B, 17C, 17D, 17E illustrate the longitudinal spherical aberration, the lateral color aberration, the distortion, the astigmatism, and the chromatic focal shift of the specific value set in the lens system of Example 8 calculated using the OSLO® optical design program.

Thus preferred lens systems and ocular configurations have been shown and described. While specific embodiments and applications for an ocular have been shown and described, it will be apparent to one skilled in the art that other modifications, alternatives and variations are possible without departing from the inventive concepts set forth herein. Therefore, the invention is intended to embrace all such modifications, alternatives and variations.

The invention claimed is:

1. An ocular for a telescopic sight such as a riflescope, binoculars or a spotting scope, comprising
   a first lens component on an objective side; and
   a second lens component on an eyepoint side, said second lens component comprising a cemented doublet lens comprised of a bi-convex lens on the eyepoint side and a bi-concave lens on the objective side, said first lens component comprising a bi-convex singlet lens constructed of optical plastic and including at least one aspheric lens surface on the objective side, said singlet lens being configured to correct aberrations accumulated from previous optics and also pre-correct aberration caused by said doublet lens.

2. An ocular according to claim 1 wherein said singlet lens is constructed of PMMA optical plastic.

3. An ocular according to claim 2 wherein said bi-convex lens of said cemented double lens is constructed of N-SF4 optical glass and said negative lens element of said cemented doublet lens is constructed of N-BAK1 or BAK1 optical glass.

4. An ocular according to claim 1 wherein said singlet lens is constructed of an acrylic polymer.

5. An ocular for a telescopic sight such as a riflescope, binoculars or a spotting scope, comprising
   a first lens component on an objective side; and
   a second lens component on an eyepoint side, said second lens component comprising a cemented doublet lens comprised of a bi-convex lens on the eyepoint side and a negative lens element on the objective side, the negative lens element comprising either a bi-concave lens or a meniscus lens, said first lens component comprising a bi-convex singlet lens constructed of optical plastic and including at least one aspheric lens surface, said singlet lens being configured to correct aberrations accumulated from previous optics and also pre-correct aberration caused by said doublet lens,
   wherein the aspheric lens surface has an aspheric profile defined according to the equation:

$$SAG = (Y^2/R)/[1+\sqrt{1-(1+K)(Y/R)^2}] + DY^4 + EY^6 + FY^8 \quad (1)$$

where SAG is surface sag as measured by the distance between a vertex of the aspheric lens surface and a point on the aspheric lens surface when the height of the point from the optical axis is expressed by Y; R denotes the radius of curvature of the vertex of the aspheric lens surface; K denotes the conic constant; and D, E and F denote aspheric coefficients, and R=51.611983
K=−1.7344
D=−9.2690e-06
E=6.0153e-09
F=−7.1982e-12.

6. An ocular according to claim 5 wherein said singlet lens is constructed of PMMA optical plastic.

7. An ocular according to claim 6 wherein said bi-convex lens of said cemented double lens is constructed of N-SF4 optical glass, and said negative lens element of said cemented doublet lens is constructed of N-BAK1 optical glass.

8. An ocular for a telescopic sight such as a riflescope, binoculars or a spotting scope, comprising
   a first lens component on an objective side; and
   a second lens component on an eyepoint side, said second lens component comprising a cemented doublet lens comprised of a bi-convex lens on the eyepoint side and a negative lens element on the objective side, the negative lens element comprising either a bi-concave lens or a meniscus lens, said first lens component comprising a bi-convex singlet lens constructed of optical plastic and including at least one aspheric lens surface, said singlet lens being configured to correct aberrations accumulated from previous optics and also pre-correct aberration caused by said doublet lens,
   wherein the aspheric lens surface has an aspheric profile defined according to the equation:

$$SAG = (Y^2/R)/[1+\sqrt{1-(1+K)(Y/R)^2}] + DY^4 + EY^6 + FY^8 \quad (1)$$

where SAG is surface sag as measured by the distance between a vertex of the aspheric lens surface and a point on the aspheric lens surface when the height of the point from the optical axis is expressed by Y; R denotes the radius of curvature of the vertex of the aspheric lens surface; K denotes the conic constant; and D, E and F denote aspheric coefficients, and R=37.661677
K=−4.089255
D=−3.3933e-07
E=−3.6632e-09
F=2.8010e-12.

9. An ocular according to claim 8 wherein said singlet lens is constructed of PMMA optical plastic, said bi-convex lens of said cemented double lens is constructed of N-SF4 optical glass, and said negative lens element of said cemented doublet lens is constructed of BAK1 optical glass.

10. An ocular according to claim 8 wherein said singlet lens is constructed of PMMA optical plastic.

11. A lens system comprising an ocular that includes
a first lens component on an objective side; and
a second lens component on an eyepoint side,
said second lens component comprising a cemented doublet lens comprised of a positive lens element on the eyepoint side and a negative lens element on the objective side,
said first lens component comprising a singlet lens element constructed of optical plastic and including an aspheric lens surface on the objective side, said aspheric singlet lens being configured to correct aberrations accumulated from previous optics and also pre-correct aberration caused by said doublet lens.

12. A lens system according to claim 11 wherein said singlet lens is constructed of PMMA optical plastic.

13. A lens system according to claim 12 wherein said bi-convex lens of said cemented double lens is constructed of N-SF4 optical glass and said negative lens element of said cemented doublet lens is constructed of N-BAK1 or BAK1 optical glass.

14. A lens system according to claim 11 wherein said singlet lens is constructed of an acrylic polymer.

15. A lens system comprising an ocular that includes
a first lens component on an objective side; and
a second lens component on an eyepoint side,
said second lens component comprising a cemented doublet lens comprised of a positive lens element and a negative lens element,
said first lens component comprising a singlet lens element constructed of optical plastic and including an aspheric lens surface on the objective side, said aspheric singlet lens being configured to correct aberrations accumulated from previous optics and also pre-correct aberration caused by said doublet lens
wherein the aspheric lens surface has an aspheric profile defined according to the equation:

$$\mathrm{SAG} = (Y^2/R)/[1+\sqrt{1-(1+K)(Y/R)^2}] + DY^4 + EY^6 + FY^8 \tag{1}$$

where SAG is surface sag as measured by the distance between a vertex of the aspheric lens surface and a point on the aspheric lens surface when the height of the point from the optical axis is expressed by Y; R denotes the radius of curvature of the vertex of the aspheric lens surface; K denotes the conic constant; and D, E and F denote aspheric coefficients, and R=51.611983
K=−1.7344
D=−9.2690e-06
E=6.0153e-09
F=−7.1982e-12.

16. A lens system according to claim 15 wherein said singlet lens is constructed of PMMA optical plastic.

17. A lens system according to claim 15 wherein said positive lens element of said cemented doublet lens is constructed of N-SF4 optical glass, and said negative lens element of said cemented doublet lens is constructed of N-BAK1 optical glass.

18. A lens system comprising an ocular that includes
a first lens component on an objective side; and
a second lens component on an eyepoint side,
said second lens component comprising a cemented doublet lens comprised of a positive lens element and a negative lens element,
said first lens component comprising a singlet lens element constructed of optical plastic and including an aspheric lens surface on the objective side, said aspheric singlet lens being configured to correct aberrations accumulated from previous optics and also pre-correct aberration caused by said doublet lens
wherein the aspheric lens surface has an aspheric profile defined according to the equation:

$$\mathrm{SAG} = (Y^2/R)/[1+\sqrt{1-(1+K)(Y/R)^2}] + DY^4 + EY^6 + FY^8 \tag{1}$$

where SAG is surface sag as measured by the distance between a vertex of the aspheric lens surface and a point on the aspheric lens surface when the height of the point from the optical axis is expressed by Y; R denotes the radius of curvature of the vertex of the aspheric lens surface; K denotes the conic constant; and D, E and F denote aspheric coefficients, and R=37.661677
K=−4.089255
D=−3.3933e-07
E=−3.6632e-09
F=2.8010e-12.

19. A lens system according to claim 18 wherein said singlet lens is constructed of PMMA optical plastic.

20. A lens system according to claim 19 wherein said positive lens element of said cemented doublet lens is constructed of N-SF4 optical glass, and said negative lens element of said cemented doublet lens is constructed of BAK1 optical glass.

* * * * *

UNITED STATES PATENT AND TRADEMARK OFFICE
CERTIFICATE OF CORRECTION

PATENT NO.         : 7,177,087 B2
APPLICATION NO.    : 10/975716
DATED              : February 13, 2007
INVENTOR(S)        : Chung-Chieh Cheng It is certified that error appears in the above-identified patent and that said Letters Patent is hereby corrected as shown below:

Title Page, item [54]
In the Title, change "ASPERIC" to --ASPHERIC--.

Column 1
Line 1, in the title, change "ASPERIC" in title to --ASPHERIC--.

Column 3
Line 27, change "filed" to --field--.

Column 4
Lines 53-55, change the equation to read $$-- SAG = (Y^2/R)/[1+\sqrt{1-(K+1)Y^2(1/R)^2}] + DY^4 + EY^6 + FY^8 --.$$

Column 6
Line 2, after "is" insert --set forth--.

Column 12
Lines 27-29, change the equation to read $$-- SAG = (Y^2/R)/[1+\sqrt{1-(K+1)Y^2(1/R)^2}] + DY^4 + EY^6 + FY^8 --.$$

Lines 65-67, change the equation to read $$-- SAG = (Y^2/R)/[1+\sqrt{1-(K+1)Y^2(1/R)^2}] + DY^4 + EY^6 + FY^8 --.$$

UNITED STATES PATENT AND TRADEMARK OFFICE
CERTIFICATE OF CORRECTION

PATENT NO. : 7,177,087 B2
APPLICATION NO. : 10/975716
DATED : February 13, 2007
INVENTOR(S) : Chung-Chieh Cheng It is certified that error appears in the above-identified patent and that said Letters Patent is hereby corrected as shown below:

Column 13
Lines 57-59, change the equation to read $$-- SAG = (Y^2/R)/[1+\sqrt{1-(K+1)Y^2(1/R)^2}]+DY^4+EY^6+FY^8 --.$$

Column 14
Lines 34-36, change the equation to read $$-- SAG = (Y^2/R)/[1+\sqrt{1-(K+1)Y^2(1/R)^2}]+DY^4+EY^6+FY^8 --.$$

Signed and Sealed this

Sixteenth Day of June, 2009

JOHN DOLL
*Acting Director of the United States Patent and Trademark Office*